(12) United States Patent
Maurer et al.

(10) Patent No.: US 6,679,500 B1
(45) Date of Patent: Jan. 20, 2004

(54) COAL PULVERIZER BRUSH SEAL ASSEMBLY

(75) Inventors: Donald G. Maurer, Windsor, CT (US); Peter L. Stanwicks, Higganum, CT (US)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 10/254,164

(22) Filed: Sep. 25, 2002

(51) Int. Cl.[7] ............................................. F16J 15/447
(52) U.S. Cl. ...................................... 277/355; 277/413
(58) Field of Search .................................. 277/355, 412, 277/413, 416, 421, 543

(56) References Cited

U.S. PATENT DOCUMENTS

| | | | | |
|---|---|---|---|---|
| 1,085,351 A | * | 1/1914 | McCandless ................. 277/355 |
| 2,176,294 A | * | 10/1939 | Cox ............................ 384/480 |
| 3,019,035 A | * | 1/1962 | Klompas ..................... 403/83 |
| 3,031,802 A | * | 5/1962 | Leliaert ....................... 451/80 |
| 3,155,395 A | * | 11/1964 | Hoffman ..................... 277/416 |
| 5,362,072 A | * | 11/1994 | Dalton ........................ 277/413 |
| 5,395,124 A | * | 3/1995 | Brandon ..................... 277/413 |
| 5,425,543 A | * | 6/1995 | Buckshaw et al. .......... 277/350 |
| 5,474,305 A | * | 12/1995 | Flower ........................ 277/355 |
| 5,630,590 A | * | 5/1997 | Bouchard et al. ........... 277/301 |
| 6,021,967 A | * | 2/2000 | Clyne et al. ................. 241/121 |
| 6,059,526 A | | 5/2000 | Mayr ........................... 415/231 |
| 6,131,910 A | * | 10/2000 | Bagepalli et al. ............ 277/355 |
| 6,308,958 B1 | * | 10/2001 | Turnquist et al. ........... 277/355 |
| 6,352,263 B1 | | 3/2002 | Gail et al. ................... 277/355 |
| 6,382,632 B1 | * | 5/2002 | Chupp et al. ................ 277/355 |

* cited by examiner

Primary Examiner—Alison K. Pickard
(74) Attorney, Agent, or Firm—Russell W. Warnock

(57) ABSTRACT

A brush seal assembly for a coal pulverizer includes multiple identical assembly segments. Each assembly segment comprises an arcuate brush assembly, a pair of clamping block assemblies and a pair of mounting bolts. The brush assembly includes a brush and an adjusting segment having a pair of elliptical openings. A radially inner end of the brush contacts the pulverizer yoke and a radially outer end is connected to the adjusting segment. Each clamping block assembly includes a clamping block, having a circular opening, a threaded rod, and a pair of jam nuts, the rod extending radially from an inner end mounted to the clamping block through the first jam nut, a hole in the adjusting segment, and the second jam nut. Each mounting bolt has a threaded shaft which extends longitudinally upward from the bolt head, through the circular opening of one of the clamping blocks and one of the elliptical openings of the adjusting segment, to a distal end portion which engages an opening of the pulverizer seal housing.

13 Claims, 7 Drawing Sheets

COAL PULVERIZER BRUSH SEAL ASSEMBLY

BACKGROUND OF THE INVENTION

This invention relates generally to coal pulverizer seals. More particularly, the present invention relates to mill-housing penetration seals for ring-bowl coal pulverizing mills. Ring-bowl mills are used in coal-fired furnaces because pulverized coal burns substantially like gas and, therefore, fires are easily lighted and controlled. Pulverized coal furnaces can be readily adapted to burn all coal ranks from anthracite to lignite.

When in operation, raw coal enters the pulverizer through a center feed pipe onto a rotating bowl. Centrifugal force causes the coal to move outward from the center and under journal assemblies, where it is crushed by large rolls. The partially pulverized material passes over the rim of the bowl, where the coal is entrained by the rising hot-air stream and pyrites and tramp iron that enter the mill with the coal fall into the millside. The rejected materials are swept out of the mill into an external hopper. The air-transported partially pulverized coal is classified on the basis of size, with the larger, heavier particles being returned to the bowl and coal having the desired particle size exiting the pulverizer.

The rotating bowl is driven by a gear drive disposed below and external to the mill housing. Since the gear unit does not penetrate the mill housing, it is not directly exposed to the pulverized coal entrained in the primary air. A mill-housing penetration seal on the grinding-bowl support hub, above the gear unit prevents airborne coal particles from settling into the gear unit. Conventionally, the mill-housing penetration seal has comprised upper and lower labyrinth seals. However, such labyrinth seals have been difficult to adjust to maintain the tight tolerances required to prevent introduction of coal particles into the gear unit.

SUMMARY OF THE INVENTION

Briefly stated, the invention in a preferred form is a brush seal assembly for a coal pulverizer which includes multiple identical assembly segments. Each assembly segment comprises an arcuate brush assembly which includes a brush and an adjusting segment. A radially inner end of the brush contacts the yoke which transmits rotary motion from the motor to the pulverizer bowl. The radially outer end is connected to the adjusting segment. At least one elliptical opening extending longitudinally through the adjusting segment, each elliptical opening extends radially from an inner end to an outer end. The assembly segment also comprises at least one clamping block assembly. Each clamping block assembly includes a clamping block and an adjustable bearing device. A substantially circular opening extends longitudinally through the clamping block. The bearing device has a first portion connected to the clamping block, a second portion which is radially moveably mounted on the first portion, and a lock for locking the second portion at a selected radial position. The second portion is engaged to the adjusting segment of the brush assembly for biasing the brush assembly in the radial direction. The assembly segment further comprises at least one mounting bolt. Each mounting bolt has a threaded shaft extending longitudinally upward from the head, through the circular opening of the clamping block assembly and the elliptical opening of the adjusting segment, to a distal end portion which engages an opening of the seal housing to clamp the brush assembly and the clamping block assembly to the seal housing.

The brush assembly preferably comprises an arcuate brush segment which includes the brush and a brush holder. The brush holder has a radially outer mounting plate portion and a radially inner brush receptacle portion, with the radially outer end of the brush being mounted in the brush receptacle portion. The brush assembly also comprises an arcuate adjusting segment which includes a radially extending mounting portion and an longitudinally extending bearing portion. The mounting portion of the adjusting segment is mounted to the mounting plate portion of the brush segment. The first portion of each adjustable bearing device is a threaded rod and the second portion and lock of each adjustable bearing device are a pair of jam nuts. The threaded rod extends radially from an inner end mounted to the clamping block, through the first jam nut, a circular hole in the bearing portion of the adjusting segment, and the second jam nut.

The brush seal assembly may also comprise an arcuate brush guard segment including a mounting portion which is clamped between the brush assembly and the seal housing. An extension portion of the brush guard segment extends radially inward over a portion of the brush to a radially inner end spaced a distance from the yoke. Preferably, the brush guard segment is composed of a material which is softer than the material of the yoke.

It is an object of the invention to provide a seal which is more tolerant to runout and field conditions than conventional coal pulverizer seals.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which:

FIG. 2 is an enlarged view of area 11 of FIG. 1;

DETAILED DESCRIPTION OF THE PREFERRED EMBODIMENT

Figure 1:
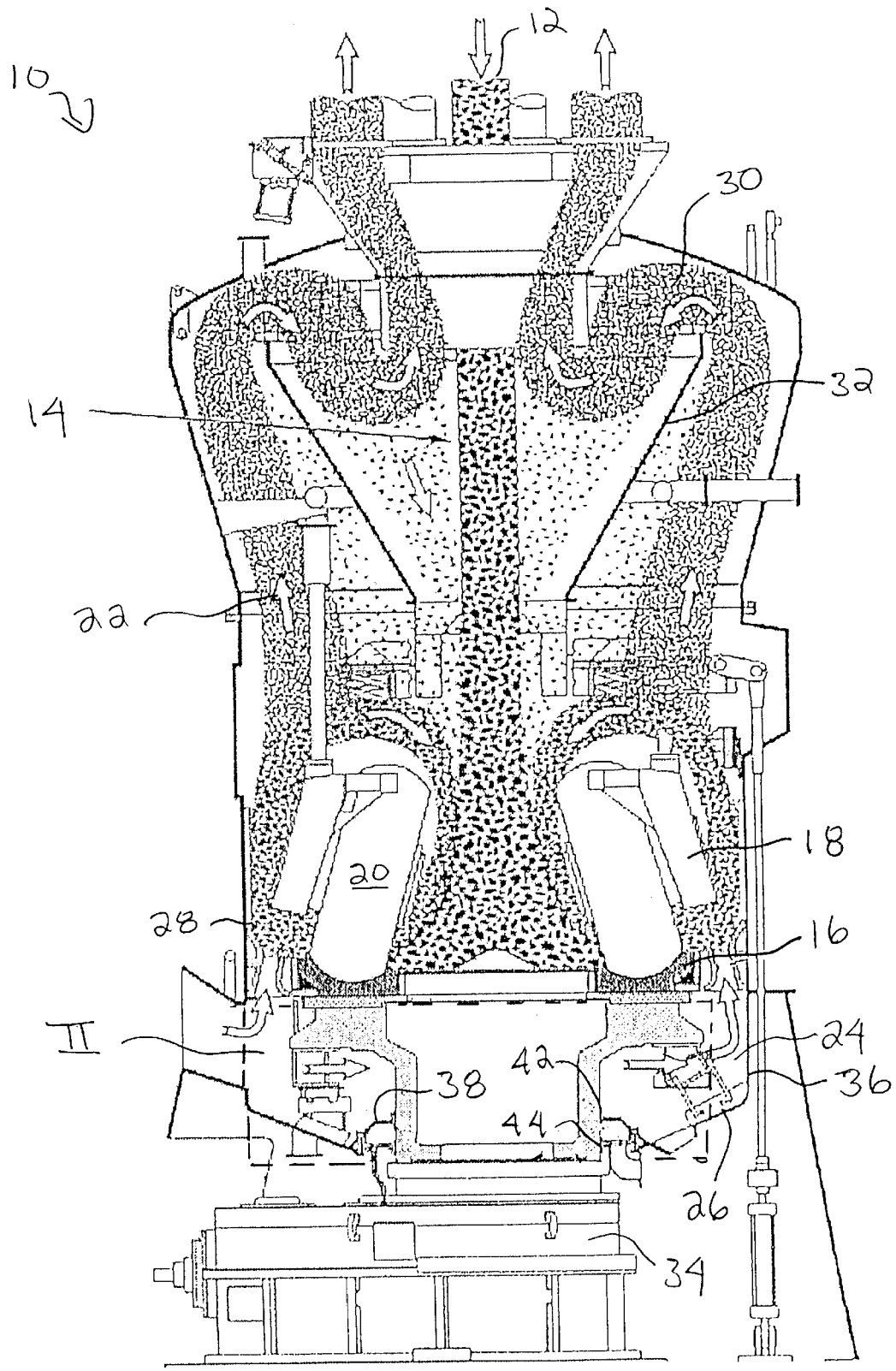
FIG. 1 is a schematic, cross-sectional view of a ring-bowl mill coal pulverizer having a brush seal in accordance with the invention.

Ring-bowl mills 10 of the type shown in FIG. 1 are used in modern coal-fired furnaces because pulverized coal burns substantially like gas and, therefore, fires are easily lighted and controlled. Pulverized coal furnaces can be readily adapted to burn all coal ranks from anthracite to lignite.

When in operation, raw coal 12 enters the center of the pulverizer 10 through a center feed pipe 14. It falls onto a rotating bowl 16 which has a replaceable wear surface composed of bull-ring segments. Centrifugal force causes the coal to move outward from the center and under the journal assemblies 18, where it is crushed by large rolls 20. The partially pulverized coal passes over the rim of the bowl 16 and is entrained by the rising hot-air stream 22 and is flash-dried. The pyrites and tramp iron that enter the mill 10 with the coal 12 follow the same path as the coal until the pass over the rim of the bowl 16. Being denser the coal, they cannot be carried upward by the air stream and fall into the millside 24. Once there, these rejected materials are swept around by a set of pivoted scrapers 26 until they reach a tramp-iron opening (not shown). They then fall into a hopper (not shown), external to the mill, which can be emptied with the mill in service.

The air-transported partially pulverized coal 22 enters the vane-wheel assembly 28, where initial size classification occurs, with the heavier particles falling back into the bowl 16. The balance of the coal and air stream passes up through the separator body until it reaches the classifier 30. Here, the coal-air mixture begins to spin in a cyclonic path. Externally adjusted vanes control the amount of spin. Because of the differing mass of the particles and the amount of spin, the oversize particles fall into the cone 32 and slide downward until they mix with the incoming, raw coal 12. In this way, only the desired size coal leaves the pulverizer 10.

The rotating bowl 16 is driven by a gear drive 34 disposed below and external to the mill housing 36. Since the gear unit 34 does not penetrate the mill housing 36, it is not directly exposed to the pulverized coal entrained in the primary air. A mill-housing penetration seal 38 on the grinding-bowl support hub 40 (or yoke), above the gear unit 34 prevents airborne coal particles from settling into the gear unit 34.

Conventionally, the mill-housing penetration seal 38 has comprised upper and lower labyrinth seals 42, 44. However, such labyrinth seals 42, 44 have been difficult to adjust to maintain the tight tolerances required to prevent introduction of coal particles into the gear unit 34.

With reference to FIG. 2, a mill-housing penetration seal 46 in accordance with the present invention includes a yoke air seal housing 48, a conventional labyrinth seal 42 disposed adjacent the upper portion of the seal housing 48 and a brush seal assembly 50 disposed adjacent the lower portion of the seal housing 48. High pressure air is introduced into the seal housing 48 via an air inlet 52 to further reduce the amount of dust that infiltrates past the upper labyrinth seal 42. The brush seal assembly 50 replaces an existing lower conventional labyrinth seal 44. To facilitate initial installation and adjustment of an installed seal, the brush seal assembly 50 is divided into multiple segments 54, preferably eight forty-five degree segments 54.

Figure 3:
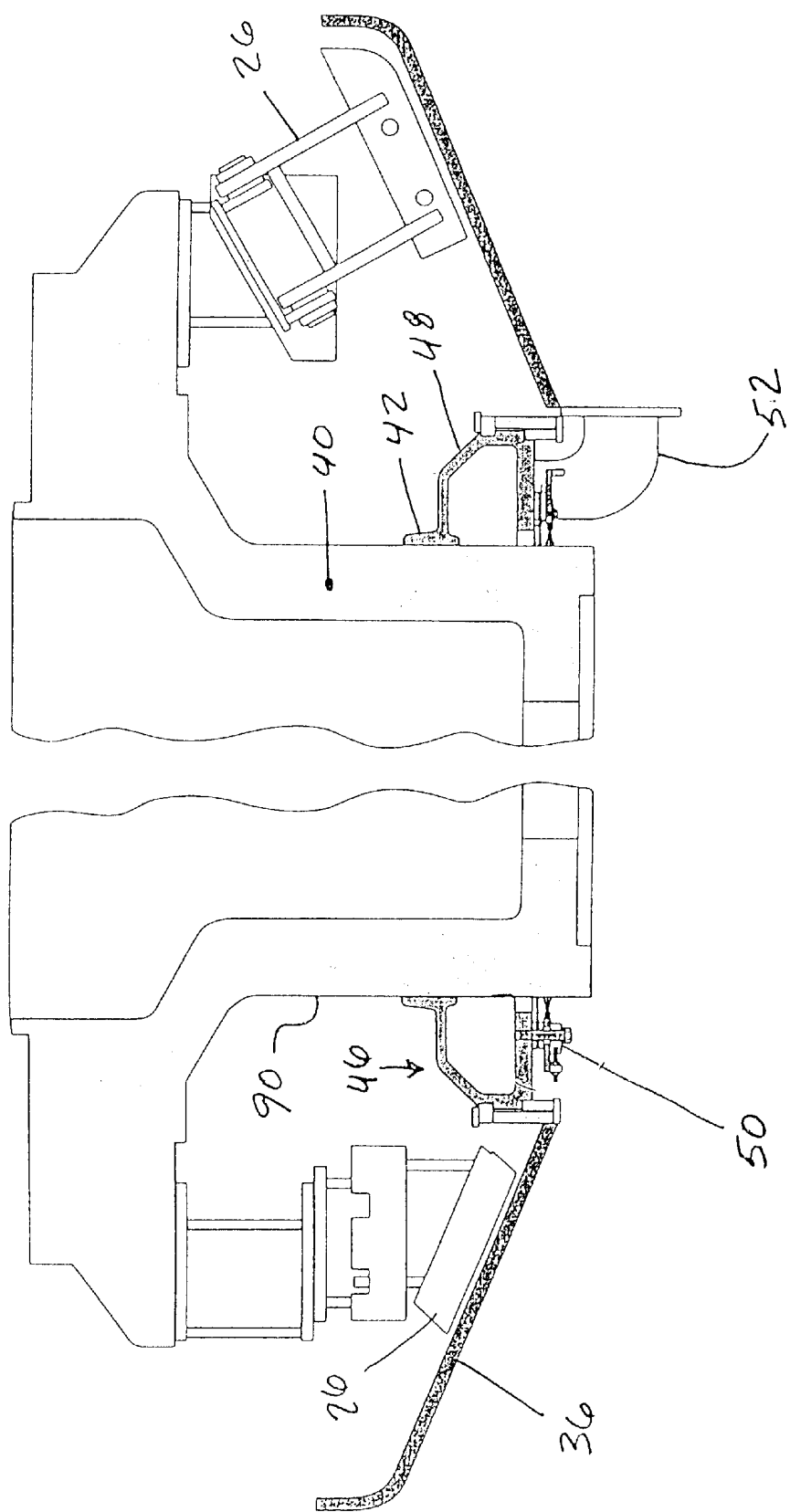
FIG. 3 is an enlarged bottom view of the brush seal assembly of FIG. 2.
Figure 3:
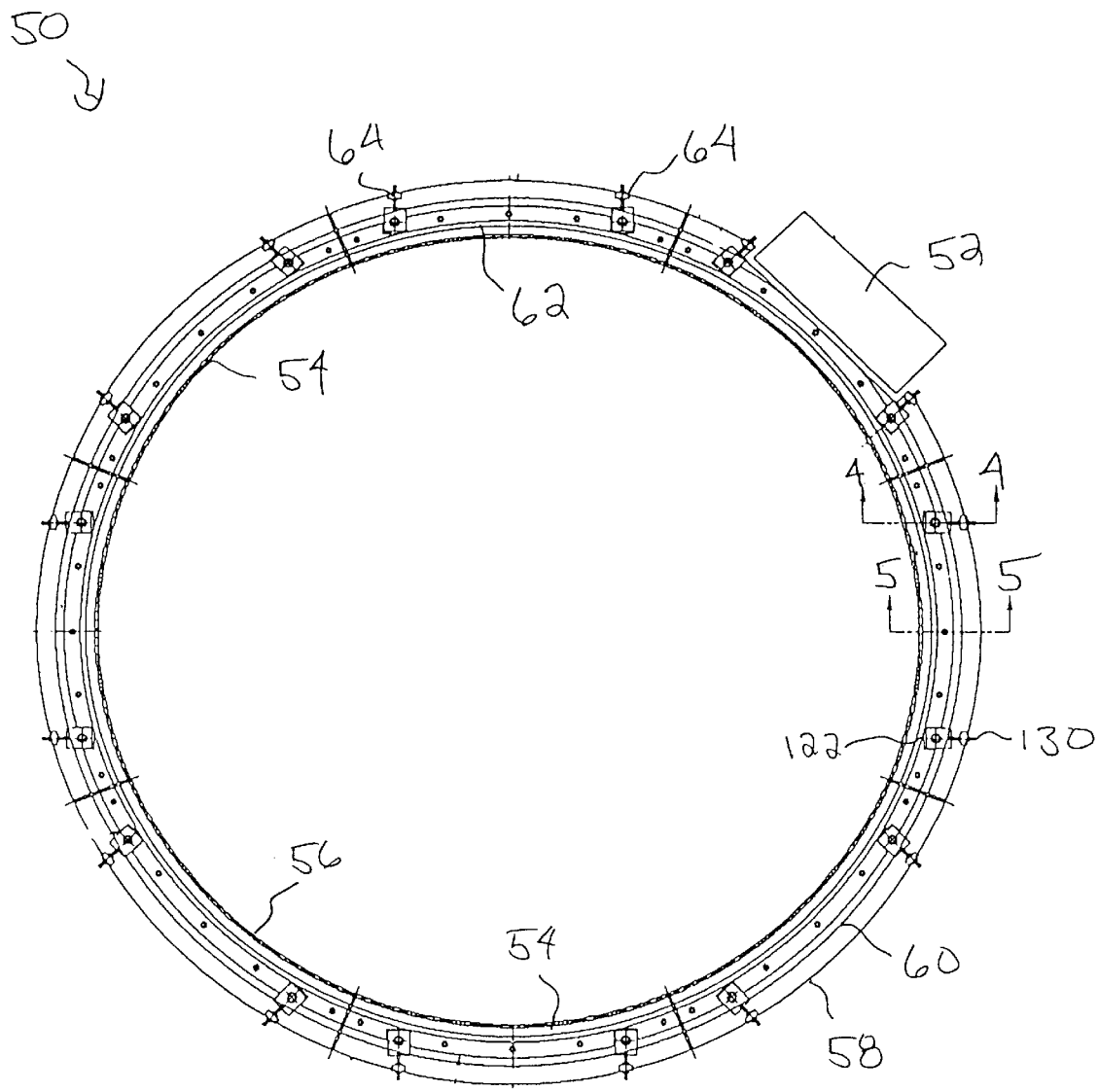
Figure 4:
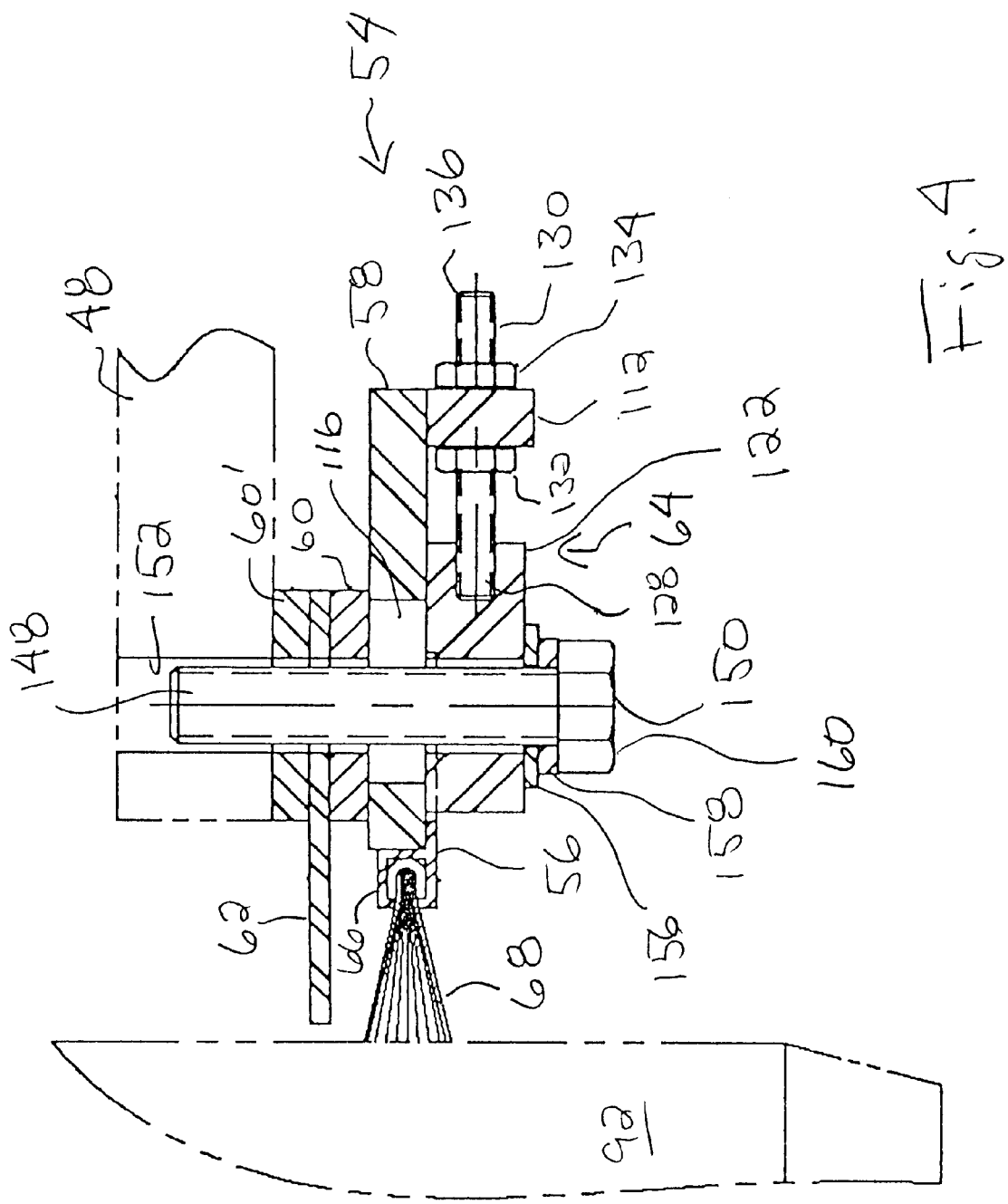
FIG. 4 is an enlarged cross-sectional view taken along line 4—4 of FIG. 3.
Figure 5:
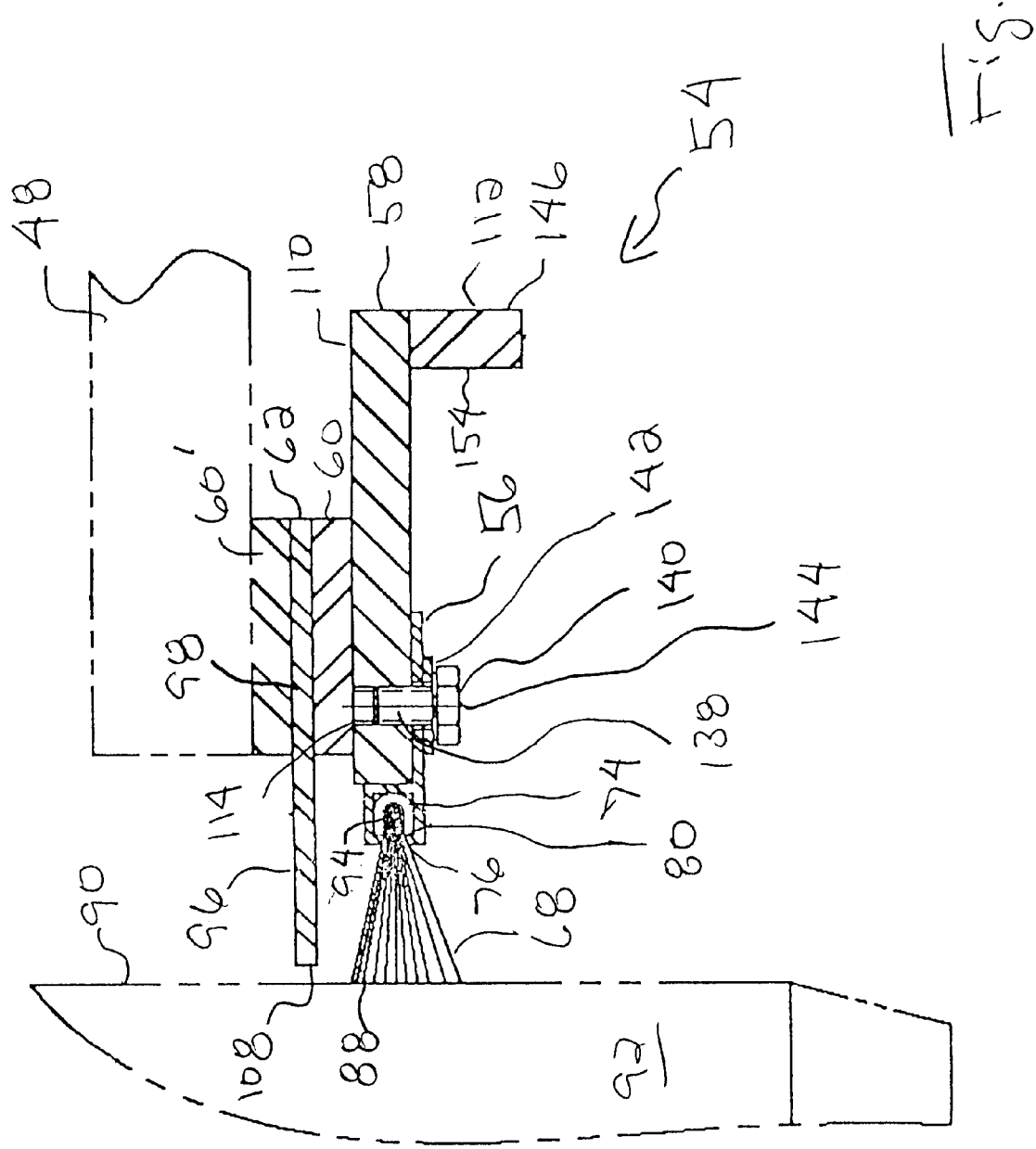
FIG. 5 is an enlarged cross-sectional view taken along line 5—5 of FIG. 3.

With reference to FIGS. 3, 4 and 5, each brush seal assembly segment 54 includes a brush segment 56, an adjusting segment 58, a pair of seal ring segments 60, 60', a brush guard segment 62, and a pair of clamping block sub-assemblies 64. The brush segment 56, adjusting segment 58, seal ring segments 60, 60', and brush guard segment 62 each have an arcuate shape defined by a 45° arc segment of the brush seal assembly 50 (FIGS. 6–9).

Figure 6:
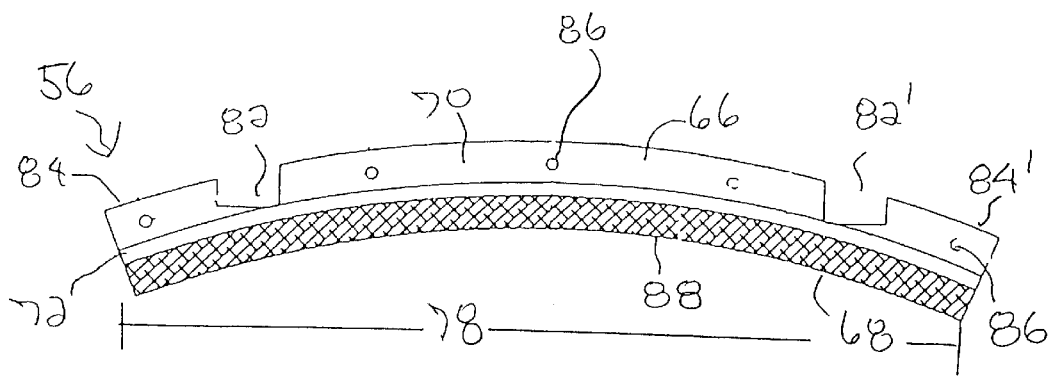
FIG. 6 is an enlarged top view of one of the brush segments of FIG. 3.

With additional reference to FIG. 6, each brush segment 56 includes a brush holder 66 and a brush 68 comprising numerous bristles. The brush holder 66 has a radially outer mounting plate portion 70 and a radially inner brush receptacle portion 72. A cavity 74 and an opening 76 in the receptacle portion 72 extend the longitudinal length 78 of the brush holder 66. The opening 76 extends radially inward from the cavity 74 to the radially inner surface of the brush holder, forming upper and lower retaining lips 80. A notch 82, 82' is formed in each end portion 84, 84' of the brush holder 66, extending radially inward from the radially outer surface of the mounting plate portion 70. The mounting plate portion 70 also includes a number of longitudinally spaced circular holes 86. The bristles of the brush 68 extend radially from a distal end 88 which sealingly engages the surface 90 of the yoke 92 to a proximal end portion 94 disposed in cavity 74. The brush 68 is mounted to the brush holder 66 by clamping the proximal end portion 94 within opening 76, between the upper and lower retaining lips 80.

Figure 7:
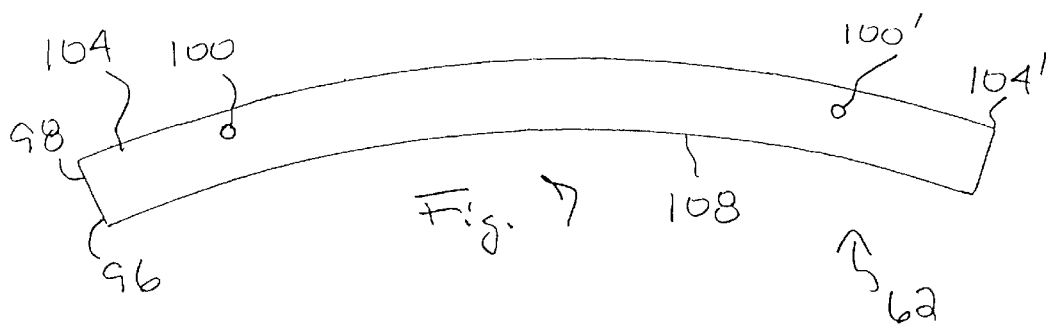
FIG. 7 is an enlarged top view of one of the brush guard segments of FIG. 3.
Figure 8:
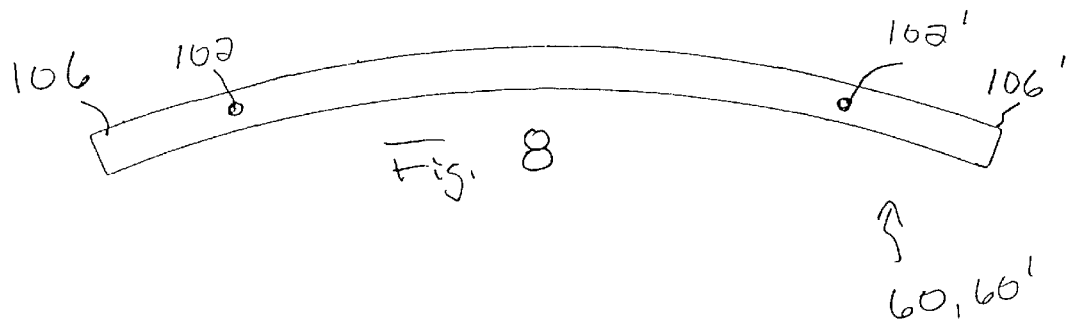
FIG. 8 is an enlarged top view of one of the seal ring segments of FIG. 3.

With additional reference to FIGS. 7 and 8, each brush guard segment 62 includes an extension portion 96 and a mounting portion 98. From a top or bottom view, each seal ring segment 60, 60' appears to be substantially identical to the mounting portion 98 of the brush guard segment 62. The brush guard segment 62 and the seal ring segments 60, 60' each have a circular hole 100, 100', 102, 102' positioned in each end portion 104, 104', 106, 106' such that the holes 100 and 102 are substantially aligned with the center of notch 82 and holes 100' and 102' are substantially aligned with the center of notch 82' in an assembled brush seal assembly segment 54. When installed, the extension portion 96 of the brush guard segment 62 extends radially inward and extends over a major portion of the brush 68 to protect the brush 68 from impact by larger, heavier particles which enter the penetration seal 46 (FIGS. 4 and 5). The radially inner end 108 of extension portion 96 is spaced a distance from the radially outer surface 90 of the yoke 92 to reduce the chance of contact therebetween. Preferably, the brush guard segment 62 is manufactured from a material (stainless steel) which is softer than the material of the yoke 92 to prevent damage to the yoke 92 in the event of inadvertent contact between the brush guard segment 62 and the yoke 92.

Figure 9:
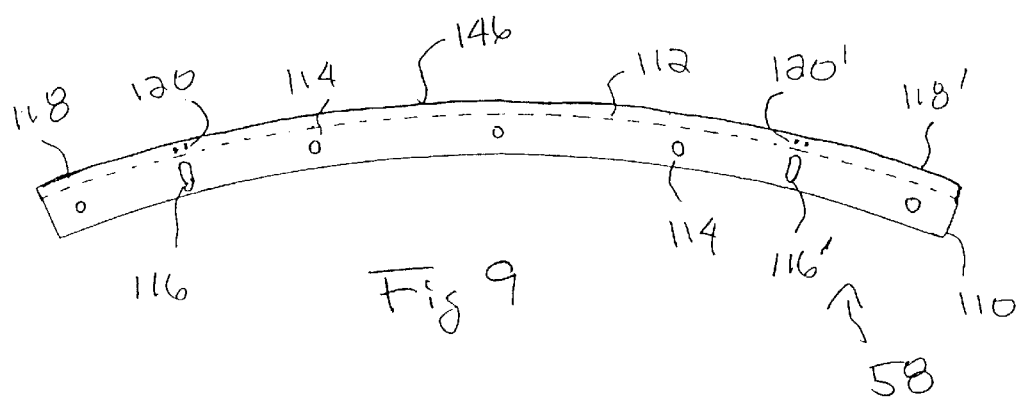
FIG. 9 is an enlarged top view of one of the adjusting segments of FIG. 3.

With additional reference to FIG. 9, each adjusting segment 58 includes a radially extending mounting portion 110 and an axially extending bearing portion 112. The mounting portion 110 has a number of longitudinally spaced circular, threaded holes 114 and an elliptical hole 116, 116', which is elongated in the radial direction, in each end portion 118, 118'. The bearing portion 112 has a circular hole 120, 120' positioned in each end portion 118, 118'. In an assembled brush seal assembly segment 54, elliptical hole 116 is aligned with holes 100 and 102, elliptical hole 116' is aligned with holes 100' and 102', circular holes 114 are aligned with holes 86, and circular holes 120 and 120' are substantially aligned with the centers of notches 82 and 82'.

Figure 10:
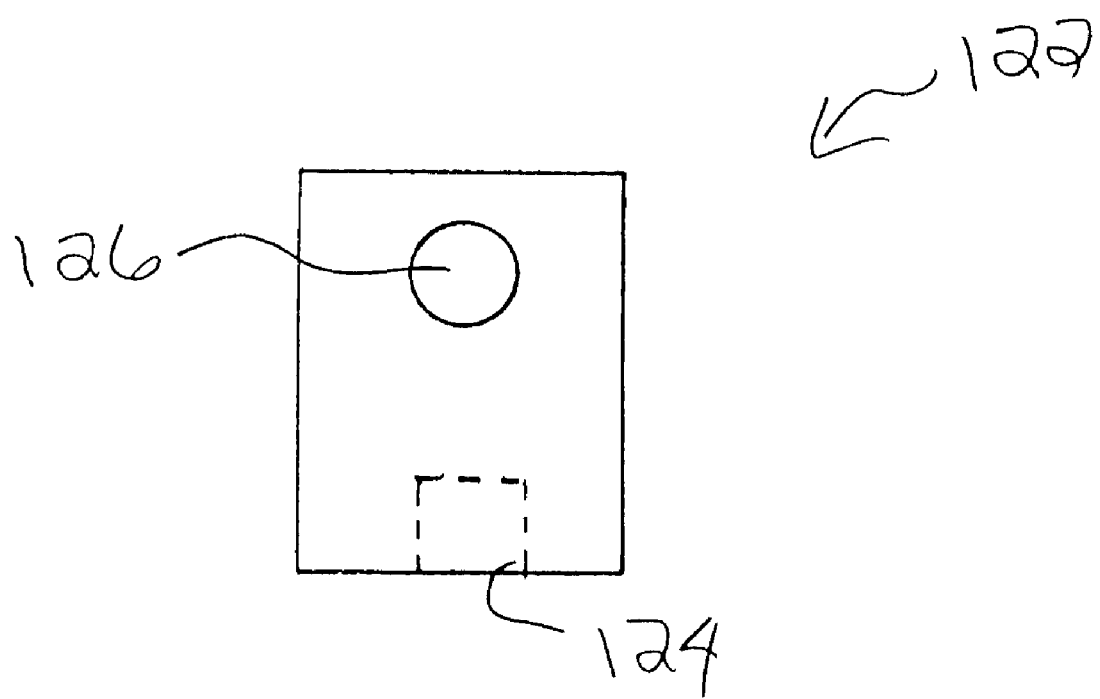
FIG. 10 is an enlarged top view of one of the clamping blocks of FIG. 3.

With additional reference to FIG. 10, each clamping block sub-assembly 64 includes a rectangular clamping block 122 having a threaded blind bore 124 extending radially from the radially outer edge and an axially extending hole 126. As explained further below, the proximal end 128 of a threaded rod 130 is mounted in blind bore 124 and extends radially outward through one of the holes 120, 120' in the bearing portion 112 of the adjusting segment 58. First and second jam nuts 132, 134 are threadably mounted on rod 130 on either side of bearing portion 112.

To install the brush seal assembly 50, the conventional, lower labyrinth seal 44 is removed. The brush seal assembly segments 54 are then assembled. First, the proximal end 128 of two of the threaded rods 130 are mounted in the blind bore 124 of two clamping blocks 122. Preferably, a thread locking compound such as Loctite 242™ is applied to the threads of proximal end 128 before it is threaded into blind bore 124. The first jam nut 132 is threaded onto rod 130 and positioned intermediate the proximal and distal ends 128, 136. The brush segment 56 is then mounted to the adjusting segment 58, inserting the threaded shaft 138 of a bolt 140 through each hole 86 in the mounting plate portion 70 of the brush segment 56 and engaging shaft 138 in a corresponding threaded hole 114 in the mounting portion 110 of the adjusting segment 58. Preferably, a washer 142 is disposed intermediate the head 144 of each bolt 140 and mounting plate portion 70. Preferably, a thread locking compound such as Loctite 242™ is applied to threaded shaft 138 and each bolt 140 is torqued to 7 ft-lbs. The clamping blocks 122 are positioned in notches 82, 82', the distal ends 136 of the rods 130 mounted thereon are inserted through the holes 120, 120' in the bearing portion 112 of the adjusting segment 158, and the second jam nut 134 is threaded on each rod 130 and hand-tightened against the radially outer surface 146 of bearing portion 112. The threaded shafts 148 of assembly bolts 150 are inserted through clamping block holes 126, adjustment segment elongated 116, 116', holes 102, 102' of the first seal ring segment 60, brush guard segment holes 100, 100', and holes 102, 102' of the second seal ring segment 60'. Preferably, a thread locking compound such as Loctite 242™ is applied to threaded shaft 148, the bush seal assembly segment 54 is raised into place within the yoke air seal housing 48, and the shaft 148 of each bolt 150 is threaded into a threaded opening 152 in yoke air seal housing 48 but not tightened. It should be appreciated that the threaded openings 152 had been used to mount the lower labyrinth seal 44. Once all of the brush seal segments 54 are initially mounted in place, the brush 68 of each seal segment 54 is adjusted to provide moderate contact between the brush distal end 88 and the surface 90 of the yoke 92. This is accomplished by sliding rods 130 within bearing portion holes 120, 120' and adjusting the position of jam nuts 132, 134 on rod 130 as necessary to achieve the proper brush position. Once the brush 68 of each seal segment 54 is properly positioned, jam nuts 132 and 134 are tightened against surfaces 154 and 146, respectively, of bearing portion 112 to lock the brush 68 in position. The assembly bolts 150 are then tightened, preferably being torqued to 40 ft-lbs. Preferably a washer 156 and a lock washer 158 is disposed intermediate the head 160 and the clamping block 122.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A brush seal assembly for a coal pulverizer, the pulverizer having a mill housing, a bowl disposed within the mill housing, a drive disposed externally to the mill housing, and a yoke transmitting rotary motion from the drive to the bowl, the mill housing having a lower end portion forming a seal housing, the yoke extending longitudinally from an upper end portion connected to the bowl, through the seal housing to a lower end portion connected to the drive, the brush seal assembly comprising a plurality of assembly segments, each assembly segment comprising:

a brush assembly having an arcuate shape, the brush assembly including a brush and an adjusting segment, the brush extending from a radially inner end to a radially outer end, the radially inner end being adapted for contacting the yoke and the radially outer end being connected to the adjusting segment, the adjusting segment defining at least one elliptical opening extending longitudinally there through, each elliptical opening extending radially from an inner end to an outer end;

at least one clamping block assembly, each clamping block assembly including a clamping block and an adjustable bearing device, the clamping block defining a substantially circular opening extending longitudinally there through, the bearing device having a first portion connected to the clamping block, a second portion radially moveably mounted along the first portion, and a lock for locking the second portion at a selected radial position, the second portion being engaged to the adjusting segment of the brush assembly for biasing the brush assembly in the radial direction; and at least one mounting bolt, each mounting bolt having a head and a threaded shaft extending longitudinally upward from the head, through the circular opening of the clamping block assembly and the elliptical opening of the adjusting segment, to a distal end portion, the distal end portion of the threaded shaft being adapted for threaded engagement with an opening of the seal housing, whereby the brush assembly and the clamping block assembly are clamped between the head of the mounting bolt and the seal housing.

2. The brush seal assembly of claim 1 wherein the brush assembly comprises an arcuate-shaped brush segment including the brush and a brush holder, the brush holder having a radially outer mounting plate portion and a radially inner brush receptacle portion, the radially outer end of the brush being mounted in the brush receptacle portion.

3. The brush seal assembly of claim 2 wherein the brush assembly also comprises an arcuate-shaped adjusting segment including a radially extending mounting portion and an longitudinally extending bearing portion, the mounting portion of the adjusting segment being mounted to the mounting plate portion of the brush segment.

4. The brush seal assembly of claim 3 wherein the brush segment and the adjusting segment each have oppositely disposed end portions and the mounting plate portion of the brush segment has a radially outer edge, each end portion of the brush segment defining a notch extending radially inward from the radially outer edge of the mounting plate portion, a one of the elliptical openings being disposed in each of the end portions of the mounting plate portion of the adjusting segment, each end portion of the bearing portion of the adjusting segment defining a substantially circular hole, the elliptical opening and circular hole in each end portion of the adjusting segment being substantially longitudinally aligned with a corresponding notch of the brush segment.

5. The brush seal assembly of claim 4 wherein a one of the clamping block assemblies is disposed in each notch of the brush segment.

6. The brush seal assembly of claim 5 wherein the first portion of each adjustable bearing device comprises a threaded rod and the second portion and lock of each adjustable bearing device comprise a pair of jam nuts, the threaded rod extending radially from an inner end mounted to the clamping block through a first of the jam nuts, the associated circular hole of the bearing portion of the adjusting segment, and a second of the jam nuts.

7. The brush seal assembly of claim 6 wherein each clamping block has a radially outer edge and defines a threaded blind bore extending radially from the radially outer edge, the inner end of the threaded rod being mounted in blind bore.

8. The brush seal assembly of claim 1 further comprising an arcuate-shaped brush guard segment including a mounting portion adapted for clamping between the brush assembly and the seal housing and an extension portion extending radially inward over a portion of the brush to a radially inner end spaced a preselected distance from the yoke.

9. The brush seal assembly of claim 8 wherein the mounting portion of the brush guard segment defines at least one substantially circular hole extending longitudinally there through, the threaded shaft of the mounting bolt extending through the circular hole.

10. The brush seal assembly of claim 8 wherein the yoke is composed of a first material and the brush guard segment is composed of a second material, the second material being softer than the first material.

11. The brush seal assembly of claim 8 further comprising first and second arcuate-shaped seal ring segments disposed longitudinally on either side of the brush guard segment.

12. The brush seal assembly of claim 11 wherein each seal ring segment defines at least one substantially circular hole extending longitudinally there through, the threaded shaft of the mounting bolt extending through the circular hole.

13. A brush seal assembly for a coal pulverizer, the pulverizer having a mill housing, a bowl disposed within the mill housing, a drive disposed externally to the mill housing, and a yoke transmitting rotary motion from the drive to the bowl, the mill housing having a lower end portion forming a seal housing, the yoke extending longitudinally from an upper end portion connected to the bowl, through the seal housing to a lower end portion connected to the drive, the brush seal assembly comprising a plurality of assembly segments, each assembly segment comprising:

an arcuate-shaped brush segment including a brush and a brush holder, the brush extending from a radially inner end to a radially outer end, the radially inner end being adapted for contacting the yoke, the brush holder having a radially outer mounting plate portion and a radially inner brush receptacle portion, the radially outer end of the brush being mounted in the brush receptacle portion, the mounting plate portion having a radially outer edge and defining a pair of notches extending radially inward from the radially outer edge;

an arcuate-shaped adjusting segment including a radially extending mounting portion and an longitudinally extending bearing portion, the mounting portion of the adjusting segment being mounted to the mounting plate portion of the brush segment and defining a pair of elliptical openings extending longitudinally there through, each elliptical opening extending radially from an inner end to an outer end, the bearing portion defining a pair of substantially circular holes extending radially there through, each elliptical opening and circular hole being longitudinally aligned with a one of the notches of the brush segment;

a pair of clamping block assemblies, a one of the clamping block assemblies being disposed in each notch of the brush segment, each clamping block assembly including a clamping block, a threaded rod, and a pair of jam nuts, the clamping block defining a substantially circular opening extending longitudinally there through, the threaded rod extending radially from an inner end mounted to the clamping block through a first of the jam nuts, the associated circular hole of the bearing portion of the adjusting segment, and a second of the jam nuts;

an arcuate-shaped brush guard segment including a mounting portion and an extension portion, the mounting portion defining a pair of substantially circular apertures extending longitudinally there through, the circular apertures being aligned with the elliptical openings of the brush segment, the extension portion extending radially inward over a portion of the brush to a radially inner end spaced a preselected distance from the yoke;

first and second arcuate-shaped seal ring segments, each seal ring segment defining a pair of substantially circular holes extending longitudinally there through, the circular holes of each seal ring segment being aligned with the elliptical openings of the brush segment; and a pair of mounting bolts, each mounting bolt having a head and a threaded shaft extending longitudinally upward from the head to a distal end portion, the threaded shaft extending through the circular opening of a one of the clamping block assemblies, the associated elliptical opening of the adjusting segment, the associated circular hole of the first seal ring segment, the associated circular aperture of the brush guard segment, and the associated circular hole of the second seal ring segment, the distal end portion of the threaded shaft being adapted for threaded engagement with an opening of the seal housing.

* * * * *